US008848886B2

(12) United States Patent
Toner et al.

(10) Patent No.: US 8,848,886 B2
(45) Date of Patent: Sep. 30, 2014

(54) SYSTEM AND METHOD FOR PROVIDING INFORMATION TO A USER OF A TELEPHONE ABOUT ANOTHER PARTY ON A TELEPHONE CALL

(75) Inventors: Victoria M. Toner, Sheboygan, WI (US); Johnny Hawkins, Kansas City, MO (US); Rich Schermerhorn, Overland Park, KS (US); Shekhar Gupta, Overland Park, KS (US); Mike A. Roberts, Overland Park, KS (US); Koushik Chatterjee, Orlando, FL (US)

(73) Assignee: CenturyLink Intellectual Property LLC, Denver, CO (US)

( * ) Notice: Subject to any disclaimer, the term of this patent is extended or adjusted under 35 U.S.C. 154(b) by 754 days.

(21) Appl. No.: 12/146,049

(22) Filed: Jun. 25, 2008

(65) Prior Publication Data
US 2009/0323912 A1 Dec. 31, 2009

(51) Int. Cl.
H04M 11/00 (2006.01)
H04M 7/00 (2006.01)
H04M 3/42 (2006.01)

(52) U.S. Cl.
CPC ........ *H04M 7/0012* (2013.01); *H04M 3/42068* (2013.01)
USPC .................................................... 379/93.23

(58) Field of Classification Search
CPC ............ H04M 3/42042; H04M 1/575; H04M 3/42068; H04M 3/4211; H04M 2203/2072; H04M 3/42059; H04M 3/51; H04M 1/2473; H04M 1/2535; H04M 3/5191; H04M 7/0012
USPC ................... 379/93.23, 90.01, 93.12, 142.06, 379/142.17
See application file for complete search history.

(56) References Cited

U.S. PATENT DOCUMENTS

| 5,546,447 | A | 8/1996 | Skarbo et al. | |
|---|---|---|---|---|
| 6,385,586 | B1 | 5/2002 | Dietz | |
| 6,539,359 | B1 | 3/2003 | Ladd et al. | |
| 6,628,770 | B1 | 9/2003 | Jain et al. | |
| 6,675,008 | B1 | 1/2004 | Paik et al. | |
| 6,681,004 | B2 * | 1/2004 | Gutta et al. | 379/142.06 |
| 6,785,368 | B1 | 8/2004 | Eason et al. | |
| 6,873,692 | B1 * | 3/2005 | Silver et al. | 379/142.17 |
| 7,027,986 | B2 | 4/2006 | Caldwell et al. | |
| 7,085,257 | B1 | 8/2006 | Karves et al. | |
| 7,236,774 | B2 | 6/2007 | Lee | |
| 7,340,390 | B2 | 3/2008 | Hurst et al. | |
| 7,454,348 | B1 | 11/2008 | Kapilow et al. | |
| 7,466,801 | B2 * | 12/2008 | Miller et al. | 379/142.01 |
| 7,606,358 | B2 * | 10/2009 | McGary et al. | 379/265.09 |
| 7,792,095 | B2 * | 9/2010 | Srinivansan | 379/265.02 |
| 7,945,037 | B1 | 5/2011 | Hogg, Jr. | |

(Continued)

OTHER PUBLICATIONS

Non-Final Rejection issued Jan. 10, 2011 for U.S. Appl. No. 12/146,096.

(Continued)

*Primary Examiner* — Stella Woo
(74) *Attorney, Agent, or Firm* — Swanson & Bratschun, L.L.C.

(57) ABSTRACT

A system and method for displaying information to a user of a telephone during a telephone call may include requesting information from a plurality of applications in response to receiving data indicative of a telecommunications device during a telephone call. The information may include information associated with a second user of the telecommunications device. The information received from the applications may be displayed for the first user to view during the telephone call.

20 Claims, 6 Drawing Sheets

(56) References Cited

U.S. PATENT DOCUMENTS

| | | | |
|---|---|---|---|
| 7,945,253 | B2 | 5/2011 | Zellner |
| 8,553,864 | B2 | 10/2013 | Chatterjee |
| 8,681,958 | B2 | 3/2014 | Chatterjee |
| 2003/0055667 | A1 | 3/2003 | Sgambaro et al. |
| 2004/0066920 | A1 | 4/2004 | Vandermeijden |
| 2004/0166832 | A1 | 8/2004 | Portman et al. |
| 2005/0100150 | A1 | 5/2005 | Dhara et al. |
| 2006/0256780 | A1 | 11/2006 | Diroo et al. |
| 2007/0026852 | A1 | 2/2007 | Logan et al. |
| 2007/0101413 | A1 | 5/2007 | Vishik et al. |
| 2007/0116239 | A1* | 5/2007 | Jacobi et al. ............. 379/265.02 |
| 2007/0143662 | A1* | 6/2007 | Carlson et al. ................. 715/507 |
| 2008/0147404 | A1 | 6/2008 | Liu et al. |
| 2008/0152097 | A1 | 6/2008 | Kent |
| 2008/0235084 | A1 | 9/2008 | Quoc et al. |
| 2009/0028179 | A1 | 1/2009 | Albal |
| 2009/0043657 | A1 | 2/2009 | Swift et al. |
| 2009/0086939 | A1 | 4/2009 | Chatterjee |
| 2009/0110162 | A1* | 4/2009 | Chatterjee .................. 379/93.23 |
| 2009/0110179 | A1* | 4/2009 | Elsey et al. ............. 379/218.01 |
| 2009/0161845 | A1* | 6/2009 | Adams et al. ............. 379/93.23 |
| 2009/0203361 | A1* | 8/2009 | Huang et al. ............... 455/414.1 |
| 2009/0326939 | A1 | 12/2009 | Toner et al. |
| 2011/0039516 | A1 | 2/2011 | Fuller et al. |
| 2011/0077046 | A1 | 3/2011 | Durand et al. |
| 2013/0267195 | A1 | 10/2013 | Fuller et al. |
| 2014/0003594 | A1 | 1/2014 | Chatterjee |
| 2014/0148139 | A1 | 5/2014 | Chatterjee |

OTHER PUBLICATIONS

Response to Non-Final Rejection Apr. 7, 2011 for U.S. Appl. No. 12/146,096.

U.S. Appl. No. 12/146,096; Notice of Non-Compliant Amendment dated Feb. 13, 2012; 2 pages.

U.S. Appl. No. 12/146,096; Non-Final Rejection dated Jan. 30, 2012; 13 pages.

U.S. Appl. No. 12/146,096; Final Rejection dated Jun. 24, 2011; 14 pages.

U.S. Appl. No. 11/977,545; Non Final Office Action dated Mar. 12, 2012; 12 pages.

U.S. Appl. No. 11/977,545; Non-Final Rejeclion dated Sep. 29, 2011; 10 pages.

U.S. Appl. No. 11/904,871; Final Rejection dated Aug. 27, 2012; 26 pages.

U.S. Appl. No. 11/977,545; Final Rejection dated Jul. 17, 2012; 20 pages.

U.S. Appl. No. 11/904,871; Non-Final Rejection dated Apr. 30, 2012; 18 pages.

U.S. Appl. No. 11/977,545; Notice of Allowance dated Jun. 3, 2013; 17 pages.

U.S. Appl. No. 11/977,545; Non Final Rejection dated Dec. 21, 2012; 19 pages.

U.S. Appl. No. 11/977,545; Issue Notification dated Sep. 18, 2013; 1 page.

U.S. Appl. No. 11/904,871; Notice of Allowance dated Nov. 1, 2013; 25 pages.

U.S. Appl. No. 14/016,886; Non-Final Office Action dated Dec. 9, 2013; 15 pages.

U.S. Appl. No. 11/904,871; Corrected Notice of Allowability dated Feb. 21, 2014; 5 pages.

U.S. Appl. No. 11/904,871; Issue Notification dated Mar. 5, 2014; 1 page.

U.S. Appl. No. 14/016,886; Non-Final Office Action dated Apr. 25, 2014; 14 pages.

U.S. Appl. No. 14/171,463; Non-Final Rejection dated Apr. 25, 2014; 24 pages.

U.S. Appl. No. 14/171,463; Final Rejection dated Aug. 15, 2014; 24 pages.

* cited by examiner

SYSTEM AND METHOD FOR PROVIDING INFORMATION TO A USER OF A TELEPHONE ABOUT ANOTHER PARTY ON A TELEPHONE CALL

BACKGROUND

Telephony and data communications have dramatically improved in recent years. One advancement includes the development of voice over Internet Protocol (VoIP). VoIP is a protocol that provides for voice communications through the Internet or other packet-switched network. VoIP telephones may communicate with the Internet in a variety of ways, including wired, wirelessly, or via a computer. In some configurations, certain control is provided by a computer and VoIP telephone, including placing and receiving calls by interfacing with a graphical user interface (GUI) on the computer. For example, a user may view a contact list and select a contact with whom to place a call via the VoIP telephone in communication with the computer.

While VoIP communications have advanced, integration and convergence of voice and data technologies remain relatively undeveloped. Continued development of voice and data integration is needed to advance convergence of voice and data communications over data networks.

SUMMARY

To advance VoIP and other voice and data technologies, the principals of the present invention provide for collecting and displaying information for a first telephone call party about a second telephone call party with whom the first telephone call party is speaking. In one embodiment, a computing unit may be in communication with a telephone, such as a VoIP telephone, and access multiple applications to collect and display data associated with the second telephone call party. The data associated with the second telephone call party may be determined based on data associated with the telecommunications device, such as caller ID data, of the second telephone call party. The data may be collected from two or more applications and displayed on a user interface for the first telephone call party. The applications may be any software applications located either locally or remotely that store information associated with the second call party.

One embodiment of a system configured to display information to a user of a telephone during a telephone call may include an input/output (I/O) unit configured to communicate voice and data communications via a network. An electronic display may be configured to display a user interface or a first user on a telephone call. A processing unit may be in communication with the I/O unit and electronic display, and be configured to request information from a plurality of applications in response to receiving data indicative of a telecommunications device to which said I/O unit is in communication during a telephone call. The information may include information associated with a second user of the telecommunications device. The information received from the applications may be displayed on the electronic display for the first user to view during the telephone call.

One embodiment of a method for displaying information to a user of a telephone during a telephone call may include requesting information from a plurality of applications in response to receiving data indicative of a telecommunications device during a telephone call. The information may include information associated with a second user of the telecommunications device. The information received from the applications may be displayed for the first user to view during the telephone call.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE DRAWINGS

Figure 1:
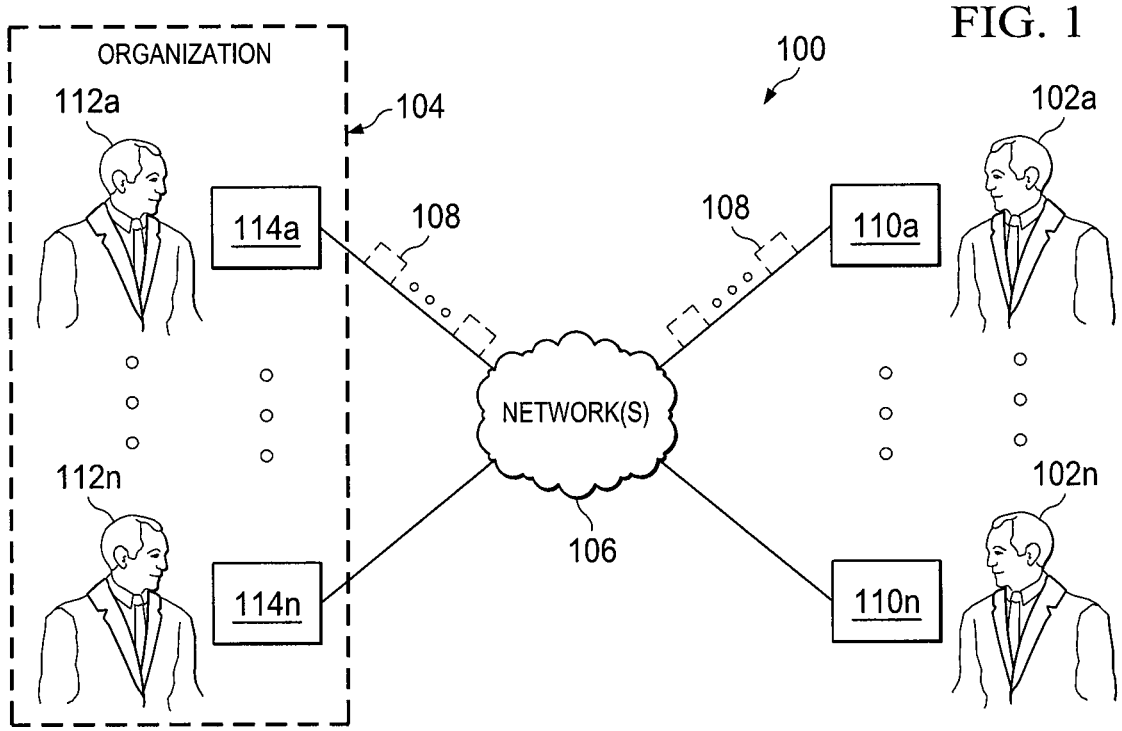
FIG. 1 is an illustration of an illustrative network environment providing voice and data communications between telecommunications device users.

With regard to FIG. 1, an illustrative network environment 100 provides for communication of voice and data between users 102a-102n (collectively 102) and an organization 104, such as a telecommunications service provider or any other business or entity. The users 102 may communicate with the organization 104 via one or more network(s) 106. The network(s) 106 may include a telecommunications network or packet-switched network, such as the Internet. The network(s) 106 may provide for voice communications in the form of data packets 108, where each of the users 102 may utilize telephones 110a-110n (collectively 110). The telephones 110 may communicate using data packets 108 or, alternatively, analog communications, as understood in the art.

The organization 104 may include employees 112a-112n (collectively 112) who communicate with the users 102 via telecommunications devices 114a-114n (collectively 114), respectively. The telecommunications devices 114 may be configured to provide voice and data communications for the employees 112. In operation, when the users 102 call employees 112 of the organization 104, data associated with the telephones 110 may be communicated to the telecommunications devices 114. The data may include caller ID or any other address information associated with the telephones 110 of the users 102. The data associated with the telephones 110 may be communicated to the telecommunications devices 114 via data packets 108 or any other data packets, as understood in the art. The data associated with the telephones 110 may enable the telecommunications devices 114 to access and display information associated with users 102 that is collected or generated by the organization 104 or any of the employees 112 of the organization 104, as further described herein.

Figure 2:
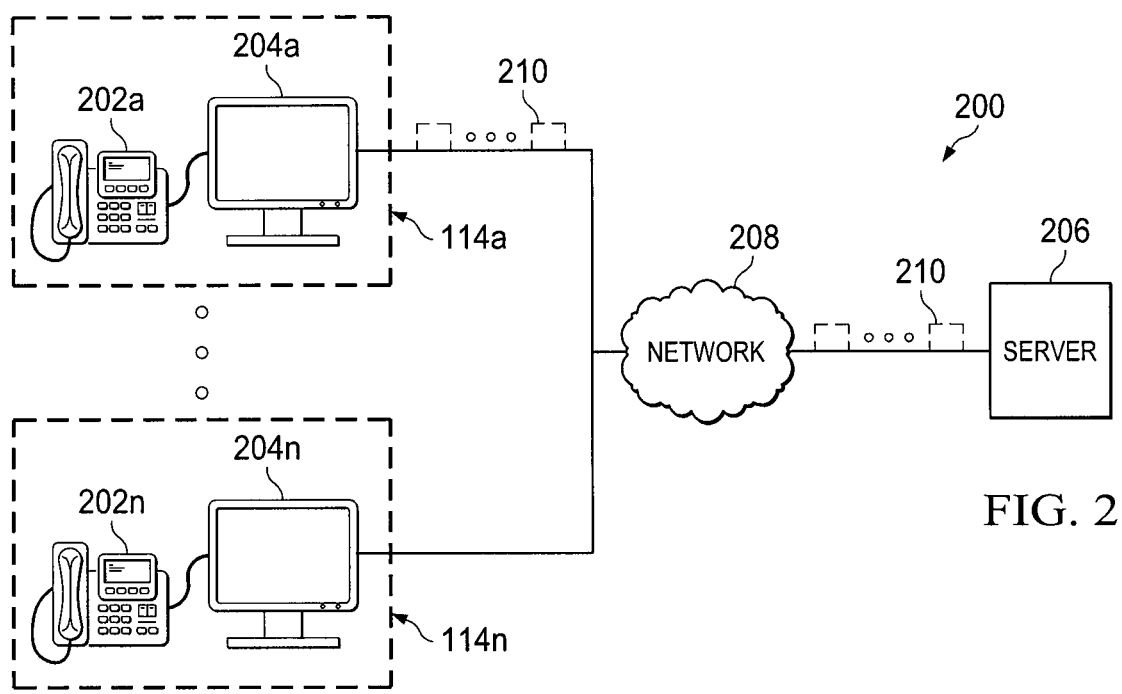
FIG. 2 is an illustration of a illustrative network environment that provides for voice and data communications and enables a user to access and display information associated with another party with whom he or she is speaking.

With regard to FIG. 2, the telecommunications devices 114 of FIG. 1 may include telephones 202a-202n (collectively 202) and computing devices 204a-204n (collectively 204). In one embodiment, the telephones 202 and respective computing devices 204 operate in conjunction with one another, such that an application running on each of the computing devices 204 may operate as a bridge or otherwise communicate with the respective telephones 202. Such a configuration provides for flexibility and functionality for uses of the telephones 202 as additional control may be provided through use of the computing devices 204.

In one embodiment, the computing devices 204 may communicate with a server 206 via a network 208. In one embodiment, the network 208 is a local network and the server 206 operates locally to support the computing devices 204. Alternatively, the network 208 is a wide area network, such as the Internet, and the server 206 operates on the network 208 remotely from the computing devices 204. Because the telephones 202 are configured to communicate voice signals via data packets 210 along with data from the computing devices 204 in the data packets 210, each may communicate with the server 206 using data packets 210. The computing devices 204 and server 206 may individually or jointly operate to provide for collecting and displaying information about a person with whom a user speaking on one of the telephones 202 during a telephone call.

Figure 3:
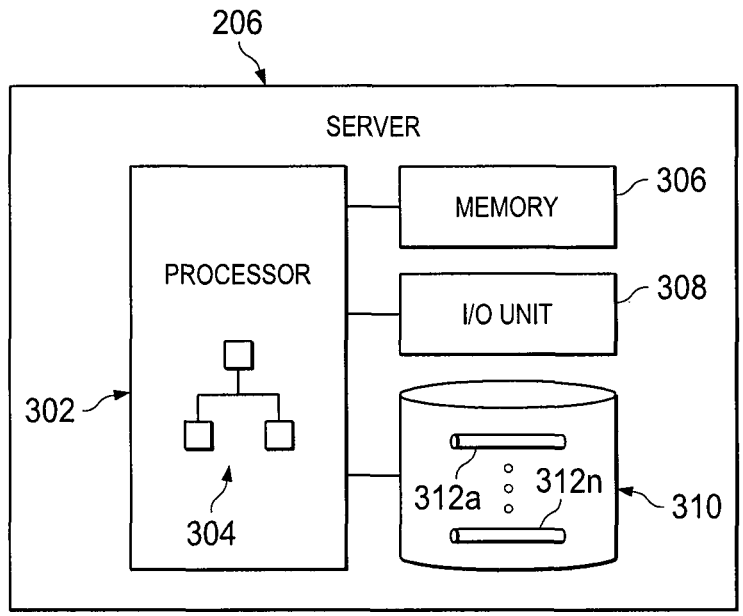
FIG. 3 is a block diagram of an illustrative server configured to provide information in accordance with the principle of the present invention.

With regard to FIG. 3, the server 206 of FIG. 2 is shown with internal components for use in providing the call party information display features in accordance with the principles of the present invention. A processing unit 302 may be utilized to execute software 304. The processing unit 302 may be in communication with a memory 306, input/output (I/O) unit 308, and storage unit 310. The storage unit 310 may be configured to store data repositories 312a-312n (collectively 312).

The software 304 may be configured to communicate with computing devices and/or telephones that display information of a call party on a telephone call. The software 304 may be configured to access information in the data repositories 312 or data repositories external from the server 206 that may be local or operating in communication with a network, such as the Internet. The memory 306 may be utilized to store data and software during execution of the software. The I/O unit 308 may be utilized to communicate with the computing devices and/or telephones, and other computing devices, such as other servers, operating on a network. The data repositories 312 may be configured to store data associated with one or more applications operating on the server 206 or other computing devices. The data repositories 312 may be databases, such as relational databases, as understood in the art. The data repositories 312 may further be completely different from one another, where one data repository, such as data repository 312a, is utilized by one application, such as a document management application, and a second data repository, such as data repository 312n, is utilized to collect and store data from a second application, such as an e-mail application. The applications may be any software application, such as a content management application, calendar management application, email management application, document management application, content management application, menu management application, website management application, and database management application.

Figure 4:
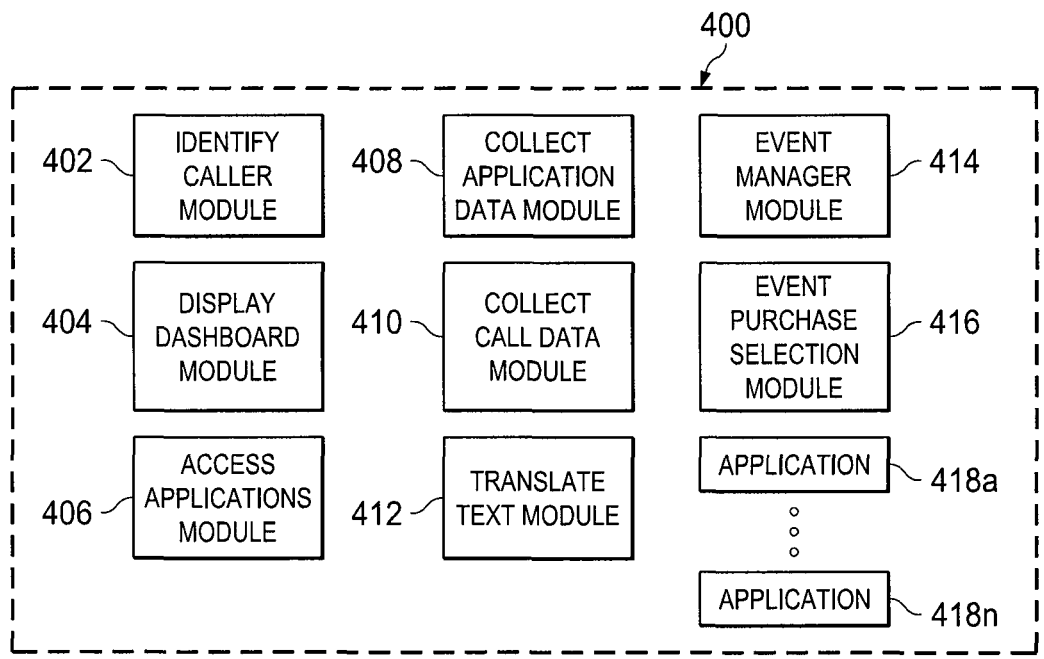
FIG. 4 is a set of illustrative modules configured to provide for user information during a telephone call.

With regard to FIG. 4, modules 400, which may be software or hardware, may be configured to provide a user of a telephone with information about a party with whom he or she is speaking on a telephone call. The modules 400 may include an identify caller module 402 that is configured to identify a caller based on information received or otherwise collected at the start of a telephone call. In one embodiment, the identify caller module 402 may be configured to use caller ID to access a data repository to identify the owner or person assigned to a telephone number. Alternatively, depending on the communications protocol, the identify caller module 402 may access an address being communicated via data packets associated with a telephone or other communications device being used by a call party and may be used to identify the caller by the identify caller module 402. In the event that the other call party is called by a user of a telephone or computing device that is operating the modules 400, the telephone number dialed may be utilized by the identity caller module 402 to identify a call party that is being called. The identify caller module 402 may access a local data repository or remote data repository on a network to look up a name, user ID, or other identifier that may be used by other modules to look up information about the call party.

A display dashboard module 404 may be configured to display a user interface (see FIGS. 6A and 6B) on a computing device or telephone. The display dashboard module 404 may be configured to display a generic user interface that may be alterable by a user to set up the user interface using his or her desired preferences for content and layout, for example. The display dashboard module 404 may be in communication with other modules to receive information of a call party for display on the user interface.

An access applications module 406 may be configured to access applications that may include information of a call party. The access applications module 406 may communicate directly with applications that are or are not currently being executed by a user on a computing device. In operation, the access applications module 406 may receive an identifier of a call party from the identify caller module 402 and communicate the identifier to one or more applications in requesting information of the call party. For example, a name of a call party may be communicated to an e-mail application that may perform a search of all recent e-mails with that call party for display of the e-mails in the user interface generated by the display dashboard module 404. In another embodiment, the access applications module 406 may use the identifier to determine a customer or client number associated with the call party and request information, such as recent documents edited by one or more employee of an organization.

A collect application data module 408 may be configured to work in conjunction with the access applications module 406 to collect data associated with a call party from an application. For example, the collect application data module 408 may use a caller ID to determine a customer or client number of the caller and access data stored in a data repository associated with an application, such as an e-mail application, word processing application, spreadsheet application, and so on, to display that application's data in a dashboard using the display dashboard module 404.

A collect call data module 410 may be utilized to collect information about a telephone call for later display in a user interface. The collect call data module 410 may collect date of call, time of call, duration of call, telephone number of call, telephone operator, and notes from a telephone operator, for example, for use in presenting call history information to the same or other users at a later time. The collect call data module 410 may operate as a separate application or be integrated with an application that includes a display dashboard module 404. In one embodiment, the collect call data module 410 utilizes one or more data repositories or databases to store data collected during telephone calls. The data collected during telephone calls may be automatically and/or manually entered by a user. For example, the information specific to the telephone call (e.g., telephone numbers, start of call, duration of call, etc.) may be automatically entered into a user interface and additional text entry fields may be available for a user to enter additional information. If, for example, a user is a customer service representative, the collect call data module 410 may be integrated into another program that operates to enable the user to enter information specific to one or more transactions that the call party with whom the user is speaking wants to conduct (e.g., stock transactions).

A translate text module 412 may be configured to enable a user to translate text being displayed by the display dashboard module 404 into one or more different languages. If a call party is bilingual, but would prefer to speak in his or her native language, then the translate text module 412 may enable a user to have the text translated from a first language into a second language (e.g., English into Spanish) to enable the user to better communicate with the call party.

An event manager module 414 may be configured to track events associated with a call party. Events may include birthdays, anniversaries, children's birthdays, or any other event that may be associated with a call party. The event manager module 414 may access the data repository in which events associated with a call party are stored. In operation, the event manager module 414 may utilize an identifier, such as a telephone number or customer number, to request events that are upcoming or recently passed and display a notification to a user via a user interface. For example, in the case of an event coming up, such as a birthday, the event manager module 414 may cause the user interface to display a message in bold lettering or in red to notify the user of the event.

An event purchase selection module 416 may be configured to enable a user to select from among a number of different purchase options or links to enable a user to purchase a gift or other item in response to an event approaching or having just passed. For example, if the person with whom the user is speaking has a birthday coming up within the next few weeks, the event purchase selection module 416 may display a number of different links to web pages or otherwise so that the user may purchase or order a gift for the person with whom he or she is speaking.

Multiple applications 418a-418n (collectively 418) may be used in conjunction with the modules 400. The applications 418 may include any application with which a user may utilize to create information for a potential caller. For example, a law firm that creates documents or performs transactions for a client may create documents over the course of time using a word processing application that interacts with a document management application for storing the documents that are created. In storing documents, the document management application may store the documents with an associated customer number. The customer number may be stored in association with the document or any other document that is created for the client and, during a telephone call, the access applications module 406 and collect application data module 408 may interact with an application, such as the document management application, to identify and collect data associated with documents that have been stored in association with the client with whom a user may be speaking. That document information may include date of edit, completion status, and a link to the document itself for display in a user interface, such as a dashboard, that the user may open during the telephone call. By being able to view recent transactions from the document management application or any other application, the user may appear to be more knowledgeable about a client and be able to answer a client's questions in a more immediate fashion.

Figure 5:
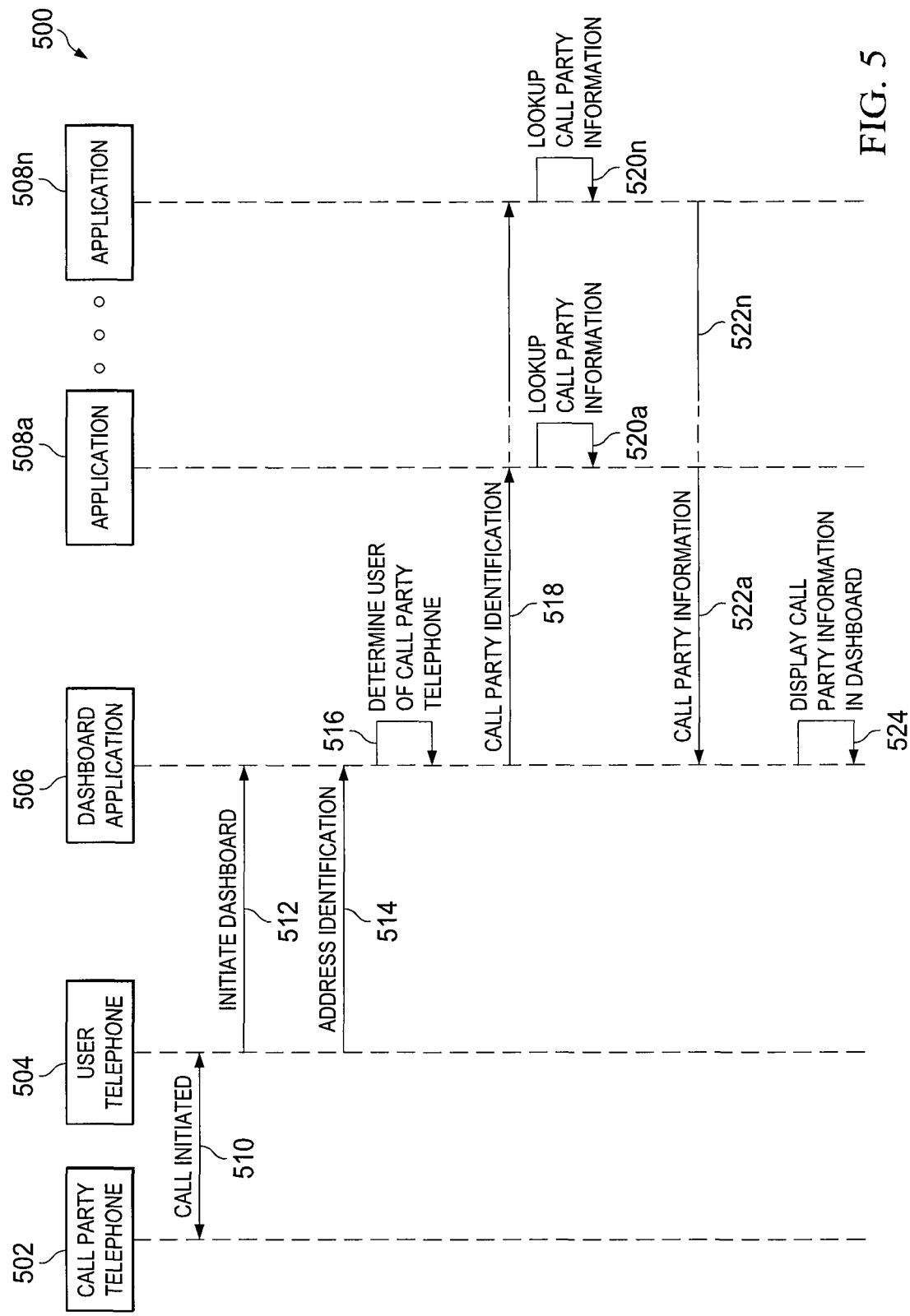
FIG. 5 is a sequence diagram of an illustrative process for providing information of another call party to a user during a telephone call.

With regard to FIG. 5, an illustrative timing diagram 500 is shown that provides for a user interface to be displayed to assist a user with information about a call party with whom he or she is speaking. As shown, a call party telephone 502, user telephone 504, dashboard application 506, and applications 508a-508n (collectively 508) are shown. The call party telephone 502 may be used by another individual who either called or has been called by a user of the user telephone 504. In one embodiment, the user telephone 504 is a VoIP telephone that includes a computing device and telephone and communication therewith. At step 510, a call may be initiated between the call party telephone 502 and user telephone 504. In the event that the call is initiated by the call party telephone 502, caller ID information may be communicated to the user telephone 504. In the event that the user telephone 504 is used to initiate the call with the call party telephone 502, telephone number information may be collected by the user telephone 504.

At step 512, the user telephone 504 may initiate the dashboard application 506 by sending data, such as telephone number or other user identifier, to the dashboard application 506. In one embodiment, the dashboard application 506 may be launched by the user telephone 504 or be continuously operating and awaiting data to be received from the user telephone 504. At step 514, an address identifier, such as a telephone number, MAC ID address, customer number, or any other identifier associated with a call party using the call party telephone 502 may be communicated from the user telephone 504 to the dashboard application 506. In an alternative embodiment, if the dashboard application 506 is used to place a call to the call party telephone 502, such as by enabling a user to look up and select contact information from the dashboard application 506, then the address identifier may not be communicated from the user telephone 504 to the dashboard application 506 as the dashboard application 506 already has the identifier of the call party.

At step 516, the dashboard application 506 may determine a user or call party of the call party telephone. In determining the user of the call party telephone, the dashboard application 506 may look up a user name associated with the address identifier received from the user telephone 504 in a local or remote database. At step 518, a call party identifier may be communicated to the applications 508. The call party identifier may be a name, customer identifier, client identifier, or any other identifier associated with a call party that may be an individual or organization. At steps 520a-520n, each of the applications 508a-508n, respectively, may look-up call party information in each of their respective data repositories. For example, a document management application may look-up any documents that have been edited in the recent past and an e-mail application may look-up any e-mails that have been communicated with the call party in the recent past. At steps 522a-522n, each of the respective applications 508 may communicate call party information that have been identified to the dashboard application 506. At step 524, call party information may be displayed in the dashboard by the dashboard application 506 for the user of the user telephone 504. The call party information may be displayed in separate regions of the dashboard depending upon how the user of the user telephone 504 has the dashboard or user interface configured.

Figure 6A:
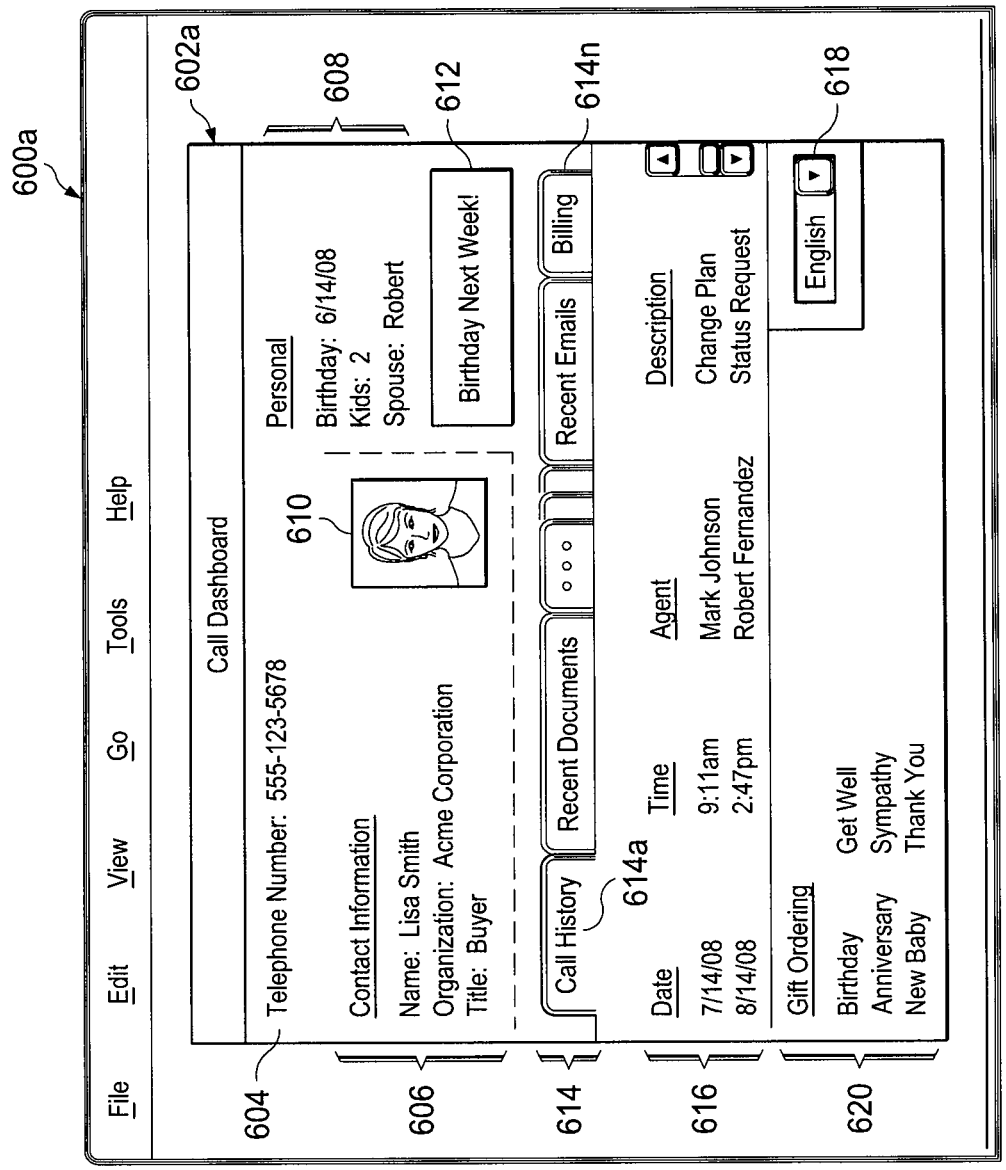
FIGS. 6A and 6B are screen shots of illustrative user interfaces that provide a user on a telephone call with information about another user with whom the user is speaking during the telephone call.
Figure 6B:
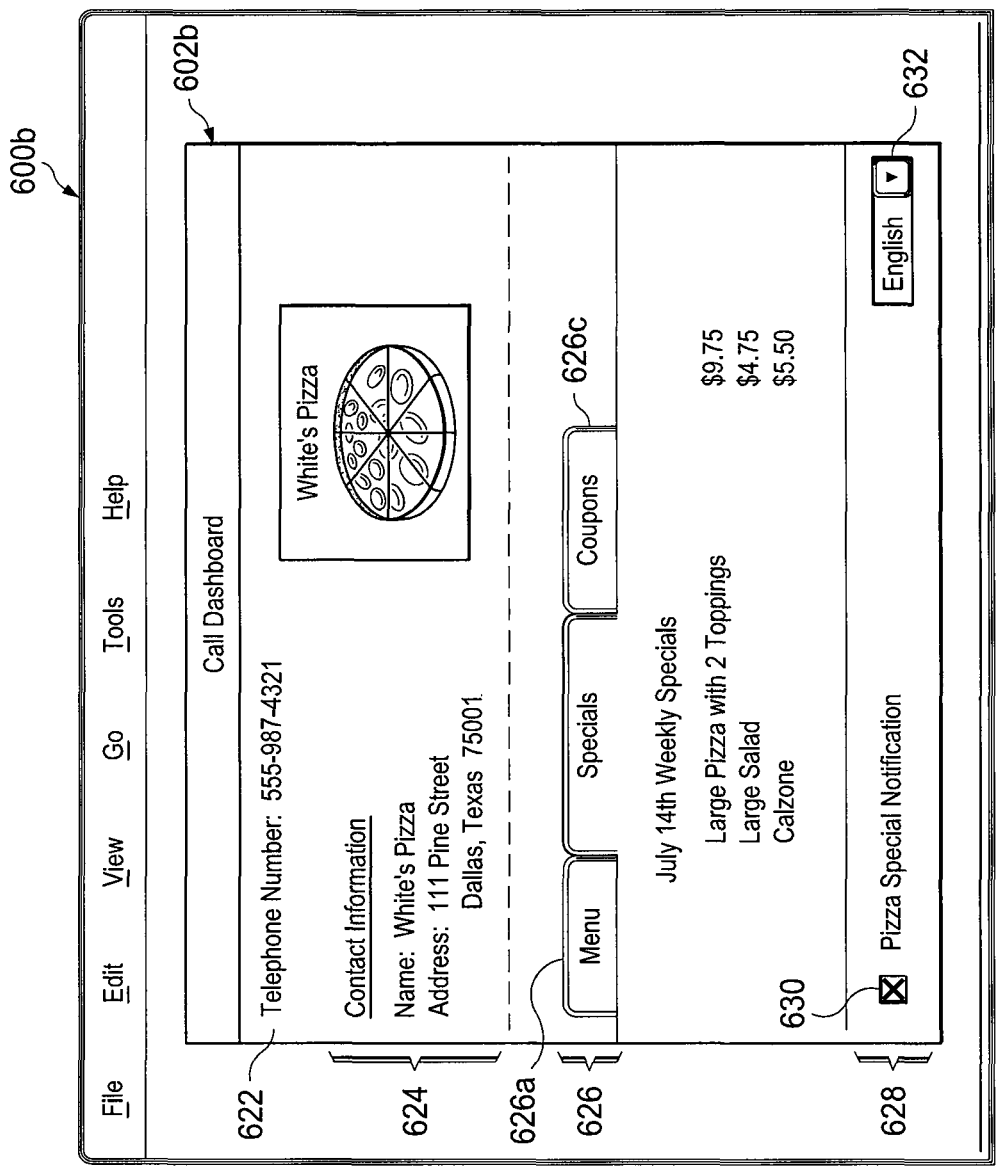

With regard to FIGS. 6A and 6B, electronic display 600a and 600b may be used to display user interfaces or "call dashboards" 602a and 602b, respectively. The call dashboard 602a is an illustrative user interface for business purposes. Call dashboard 602b is an illustrative user interface for personal purposes.

In call dashboard 602a, a telephone number 604 may be displayed, where the telephone number 604 is the telephone number of a call party with whom a user of the user interface is speaking. In an alternative embodiment, rather than displaying the telephone number, an address or other address identifier may be displayed. Contact information 606 may be displayed for the user, where the contact information may include name of the individual, call party with whom the user is speaking, organization that the call party works, title of the call party, etc. In addition, personal information 608 may be displayed, where the personal information 608 may include birthdate, number of children, spouse name, and so forth. In addition, if a photograph is available, a photograph 610 may be displayed for the user to view. In addition, any upcoming event, such as birthday, may be displayed in an event display region 612. The contact information, personal information, photograph, and events information may be stored in one or more data repositories by one or more applications.

A set of tabs 614a-614n (collectively 614) may be available for the user to select to display associated information with each of the tabs. The tabs 614 may include call history, recent documents, recent e-mails, billing etc. The call history may include a list of calls 616 with which one or more users may have had with the call party. As shown, different agents are shown to communicate with the call party for different reasons (e.g., to change a service plan and to receive a status request).

A language selector element 618 may be available for the user to select a particular language that the call party prefers. While the user may be bilingual, he or she may benefit from having the translated text displayed rather than having to translate from English to a different language or vice versa. A gift ordering section 620 may provide a list of categories from which the user may select. In response to a user selecting one of the categories, a number of domain names or websites may be displayed for the user to select. For example, in a case of a birthday, flower company websites, jewelry store websites, or any other websites that may be helpful for the user to order a birthday present may be presented to the user.

As shown, the information displayed in the call dashboard 602a is collected from multiple applications, including a contact application, such as e-mail contact list, and document management application. By aggregating and making available for display information from multiple applications, a user handling a telephone call may be more efficient in remembering or locating information about which a call party may be interested.

With regard to FIG. 6B, the call dashboard 602b may include a telephone number 622 and contact information 624. Because the user of the call dashboard 602b is in an individual who may call a business, such as a pizza restaurant, the business establishment may store information associated with the business establishment using one or more applications located on a network, such as the Internet. The information may include information specific to the particular business establishment or within an industry group. For example, the contact information of a call party may be that of a pizza restaurant and menu information, specials, and coupons may be stored in one or more data repositories for display to a user of the call dashboard 602b who has called the restaurant. As shown, a set of tabs 626a-626c may be displayed and be selectable, such that the user may select whether to view a menu, specials, or coupons associated with the pizza restaurant. In addition, a region 628 may display a graphical element 630 that is selectable to cause a notification to be communicated to the user when a special (e.g., pizza special) is offered to customers of the pizza restaurant. In addition, another selectable element 632 may enable the user to select whether to view the information displayed in the call dashboard 602b in English or any other language.

Figure 7:
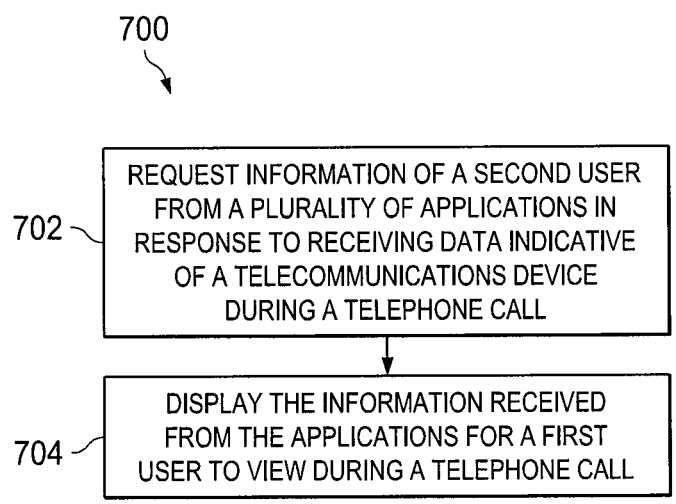
FIG. 7 is a flow diagram of an illustrative process for providing information of another call party to a user during a telephone call.

With regard to FIG. 7, an illustrative process 700 may include requesting information of a call party from a plurality of applications in response to receiving data indicative of a telecommunications device during a telephone call at step 702. At step 704, the information of the call party received from the applications may be displayed for a user to view during a telephone call. The applications may include any software applications that data associated with the user may be collected. For example, the data may include documents, emails, calendar entries, and so forth.

Although a few embodiments of the present general inventive concept have been illustrated and described, it will be appreciated by those skilled in the art that changes may be made in these exemplary embodiments without departing from the principles of the general inventive concept, the scope of which is defined in the appended claims and their equivalents.

What is claimed is:

1. A system configured to display information to a user of a first telecommunications device during a telephone call with a second user of a second telecommunications device, said system comprising:
   an input/output (I/O) unit configured to communicate voice and data communications via a network;
   an electronic display configured to display a user interface for the first user; and
   a processing unit in communication with said I/O unit and electronic display, said processing unit configured to:
      in response to receiving, from the first telecommunications device, data indicative of the second telecommunications device with which the first telecommunications device is in communication during a telephone call, request information from a plurality of applications, the information including at least the second user's telephone number, contact information, personal information and one or more future events associated with the second user, wherein at least one of the applications is remotely located with respect to said processing unit and available via a network; and
      display the information received from the applications on said electronic display for the first user to view during the telephone call;
   wherein the system is separate from the first telecommunications device and the second telecommunications device, and the I/O unit is in communication with the first telecommunication device.

2. The system according to claim 1, wherein the plurality of applications include at least two of a content management application, calendar management application, email management application, document management application, content management application, menu management application, website management application, and database management application.

3. The system according to claim 1, wherein the data indicative of the second telecommunications device includes a telephone number of the second telecommunications device.

4. The system according to claim 1, wherein said processing unit, in displaying the information received from the applications, is configured to display a graphical user interface having a plurality of regions, each region configured to display information from respective different applications.

5. The system according to claim 1, wherein at least one of the applications is locally located with respect to said processing.

6. The system according to claim 1, wherein said processing unit is further configured to receive the data via Voice over Internet Protocol (VoIP) data packets and communicate the VoIP data packets to a the first telecommunication device.

7. The system according to claim 1, wherein said processing unit is further configured to display a list of selectable elements that enable the first user to purchase goods or services in response to viewing the information displayed on said electronic display.

8. The system of claim 1 wherein the second user's contact information comprises the second user's name, business organization name and title.

9. The system according to claim 1 wherein the second user's personal information comprises the second user's birthdate, number of children and spouse's name.

10. The system of claim 1 wherein the one or more future events associated with the second user comprises a notification that the second user's occurs in the next week.

11. A method for displaying information to a first user of a first telecommunications device during a telephone call with a second user of a second telecommunications device, said method comprising:
   in response to receiving, at a computer and from the first telecommunications device, data indicative of the second telecommunications device during the telephone call requesting, by the computer, information from a plurality of applications, the information including at least the second user's telephone number, contact information, personal information and one or more future events associated with the second user, wherein requesting information from at least one of the applications includes requesting information from at least one application remotely located and available via a network;
   displaying the information received from the applications for a first user to view during the telephone call;
   wherein the computer is separate from the first telecommunications device and the second telecommunications device, and the computer is in communication with the first telecommunications device.

12. The method according to claim 11, requesting information from a plurality of applications includes requesting information from at least two of a content management application, calendar management application, email management application, document management application, content management application, menu management application, website management application, and database management application.

13. The method according to claim 11, wherein receiving the data indicative of the second telecommunications device includes receiving a telephone number of the second telecommunications device.

14. The method according to claim 11, wherein, in displaying the information received from the applications, displaying a graphical user interface having a plurality of regions, each region configured to display information from respective different applications.

15. The method according to claim 11, wherein requesting information from at least one of the applications includes requesting information from at least one application locally located.

16. The method according to claim 11, further comprising:
   receiving the data via Voice over Internet Protocol (VoIP) data packets; and
   communicating the VoIP data packets to the first telecommunications device for the first user to utilize during the telephone call.

17. The method according to claim 11, further comprising displaying a list of selectable elements that enable the first user to purchase goods or services in response to viewing the information.

18. The method of claim 11 wherein the second user's contact information comprises the second user's name, business organization name and title.

19. The method of claim 11 wherein the second user's personal information comprises the second user's birthdate, number of children and spouse's name.

20. The method of claim 11 wherein the one or more future events associated with the second user comprises a notification that the second user's occurs in the next week.

* * * * *